(12) United States Patent
Stedman et al.

(10) Patent No.: US 8,684,450 B2
(45) Date of Patent: Apr. 1, 2014

(54) VEHICLE STRUCTURE AND METHOD OF ASSEMBLY

(75) Inventors: Dennis F. Stedman, Ortonville, MI (US); William R. Schmidt, White Lake, MI (US); Douglas P. Smith, Clarkston, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 336 days.

(21) Appl. No.: 12/944,136

(22) Filed: Nov. 11, 2010

(65) Prior Publication Data

US 2012/0119543 A1    May 17, 2012

(51) Int. Cl.
*B62D 25/08* (2006.01)

(52) U.S. Cl.
USPC .................. 296/193.09; 296/203.02; 280/785

(58) Field of Classification Search
USPC ............ 296/193.04, 193.09, 203.03; 280/785
See application file for complete search history.

(56) References Cited

U.S. PATENT DOCUMENTS

| | | | |
|---|---|---|---|
| 5,573,299 A * | 11/1996 | Masuda | 296/193.09 |
| 6,398,262 B1 | 6/2002 | Ziech et al. | |
| 6,669,422 B1 * | 12/2003 | Sterle | 411/384 |
| 6,886,886 B2 | 5/2005 | Seksaria et al. | |
| 7,503,603 B2 | 3/2009 | Braunbeck et al. | |
| 2008/0258449 A1 | 10/2008 | Wehner et al. | |
| 2008/0308332 A1 | 12/2008 | Gonzalez-Salvador | |

* cited by examiner

*Primary Examiner* — Glenn Dayoan
*Assistant Examiner* — Melissa A Black
(74) *Attorney, Agent, or Firm* — Ralph E Smith

(57) ABSTRACT

A structure for a vehicle may include first and second spaced-apart members, first and second internally-threaded members, a module, first and second connecting members, and first and second fasteners. The first and second internally-threaded members may be connected to the first and second members, respectively. The module is positioned between the first and second members for a predetermined alignment relative thereto. The first and second connecting members include an outer surface having external threads and an inner surface having internal threads. The outer surface may engage a corresponding one of the internally-threaded members. The external and internal threads have opposite thread-handedness. The first and second fasteners engage the internal threads of the first and second connecting members, respectively. The first and second fasteners may move the first and second connecting members toward the module to clamp the module relative to the first and second members and maintain alignment therebetween.

18 Claims, 8 Drawing Sheets

VEHICLE STRUCTURE AND METHOD OF ASSEMBLY

FIELD

The present disclosure relates to vehicle structure and a method for assembling the structure, and more particularly to structure and a method for assembly a front-end module to a vehicle frame in a manner that maintains predetermined alignment therebetween.

BACKGROUND

Vehicle manufacturing may include a modular approach to vehicle assembly whereby individual components are preassembled into subassemblies or modules prior to integration into a vehicle body. Such an approach may increase manufacturing efficiency and throughput. For example, a preassembled front-end module may include a front fascia, a grille, exterior lighting units (i.e., headlights, turn signals, and/or fog lights), a front bumper, and structural members supporting such components. The front-end module may be assembled as a unit onto the vehicle chassis or frame. The front-end module can optionally be installed onto the vehicle chassis or frame after an engine, motor or other source of rotary power is installed into the vehicle to provide improved access to an engine or motor compartment during installation of the engine or motor.

SUMMARY

In one form, the present disclosure provides a structure for a vehicle that may include first and second members, first and second internally-threaded members, a module, first and second connecting members, and first and second fasteners. The first and second members may be spaced apart from each other. The first and second internally-threaded members may be connected to the first and second members, respectively. The module may be positioned between the first and second members for a predetermined alignment relative to the first and second members. The first and second connecting members may each include an outer circumferential surface having external threads and an inner circumferential surface having internal threads. The outer circumferential surface may threadably engage a corresponding one of the first and second internally-threaded members. The external threads and the internal threads may have opposite thread-handedness. The first and second fasteners may threadably engage the internal threads of the first and second connecting members, respectively. The first and second fasteners may be configured to move the first and second connecting members toward the module to clamp the module relative to the first and second members and maintain the predetermined alignment between the module and the first and second members.

In another form, the present disclosure provides a method of assembling a vehicle that may include providing first and second rails and first and second internally-threaded members connected to the first and second rails, respectively. First and second connecting members may be provided that each includes internal threads and external threads. A module may be provided that may include first and second portions. The external threads of the first and second connecting members may be engaged with the first and second internally-threaded members, respectively. An alignment of said module relative to said first and second rails may be established. A first fastener associated with the first portion may be engaged with the internal threads of the first connecting member. The first fastener may be rotated in a first direction to cause the first connecting member to rotate relative to the first internally-threaded member such that the first connecting member moves away from the first internally-threaded member to secure the module relative to first connecting member. The first fastener may be further rotated in the first direction such that the first fastener moves toward the module to threadably tighten the first fastener relative to the first connecting member to secure the module relative to the first rail.

Further area of applicability of the present disclosure will become apparent from the detailed description and claims provided hereinafter. It should be understood that the detailed description, including disclosed embodiments and drawings, are merely exemplary in nature intended for purposes of illustration only and are not intended to limit the scope of the invention, its application or use. Thus, variations that do not depart from the gist of the invention are intended to be within the scope of the invention.

DETAILED DESCRIPTION

Figure 1:
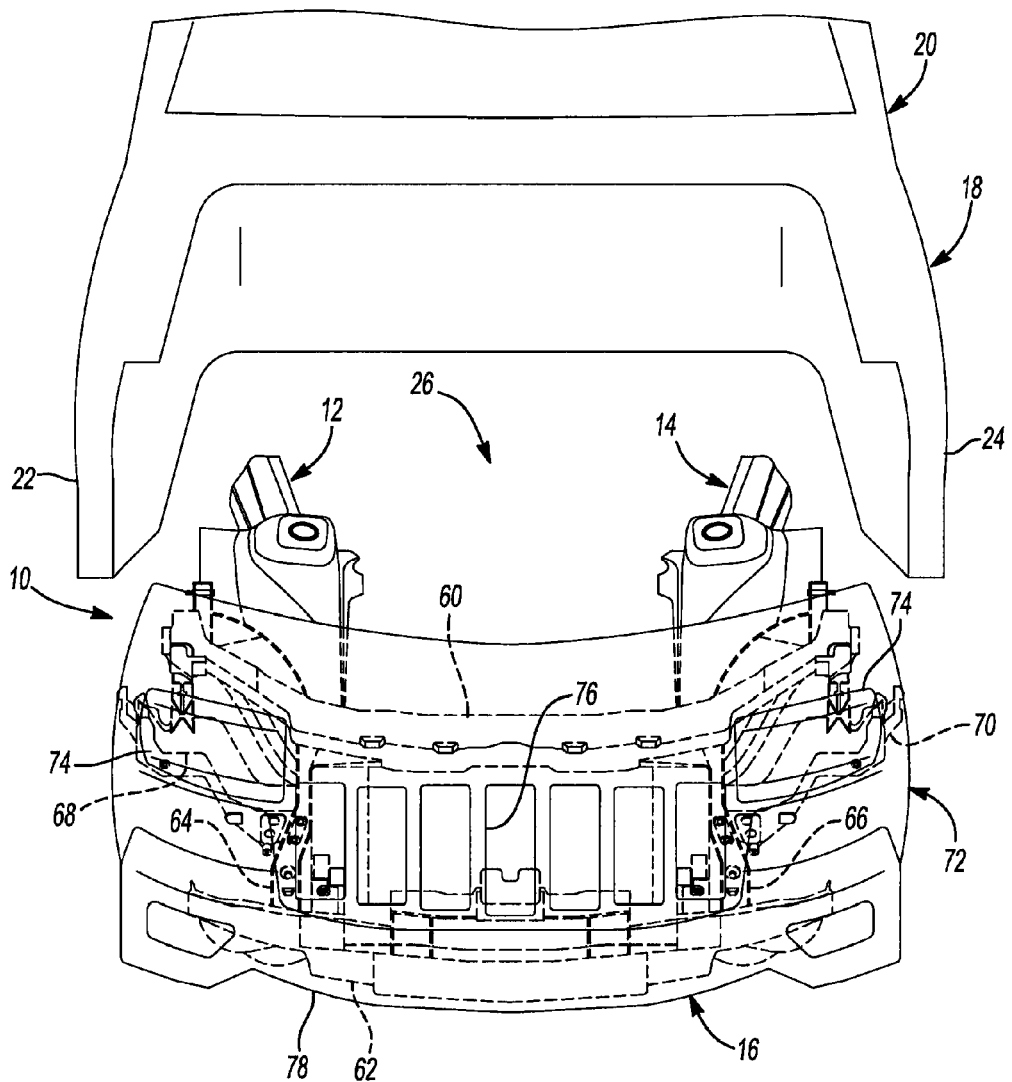
FIG. 1 is a partially exploded perspective view of a vehicle including a frame having a front-end module according to the principles of the present disclosure.

Disclosed herein are exemplary embodiments of assembly of vehicle structure, including modular portions, so as to maintain predetermined alignment therebetween. With reference to FIGS. 1-10, a vehicle frame 10 is provided that may include a first rail 12, a second rail 14, and a front-end module 16. The vehicle frame 10 may support a body 18, suspension (not shown), and drivetrain (not shown) of a vehicle 20. The first and second rails 12, 14 may be disposed adjacent to corresponding first and second front quarter panels 22, 24 of the body 18 and may cooperate with the front-end module 16 to define an engine or motor compartment 26. The front-end module 16 may be installed onto the remainder of the vehicle 20 independently from the remainder of the vehicle frame 10. It should be appreciated that the vehicle 20 could be any type of vehicle such as a car, sport-utility vehicle, crossover vehicle, pickup truck, van, recreational vehicle, commercial or industrial truck or equipment, or a military vehicle, for example. The vehicle 20 can be powered by an internal combustion engine and/or an electric motor, for example, and/or any other power source.

The first and second rails 12, 14 may be elongated members extending generally toward a front-end of the vehicle 20. Each of the first and second rails 12, 14 may include an outer portion 27, a first portion 28, a second portion 30 (FIG. 5), first and second pipe nuts 32, 34, and first and second T-nuts 36, 38. The first and second portions 28, 30 may extend generally inwardly from the outer portion 27. The first portion 28 may include an aperture or slot 40 extending therethrough, and the second portion 30 may include a slot or aperture 42 extending therethrough.

The first and second pipe nuts 32, 34 may be welded or otherwise fixedly secured to the first and second portions 28, 30, respectively. The pipe nuts 32, 34 may be generally elongated members having a threaded aperture 44 extending at least partially therethrough. The threaded apertures 44 of the first and second pipe nuts 32, 34 may be substantially aligned with the slot 40 and aperture 42, respectively. The threaded apertures 44 may include left-handed threads. In another embodiment, the spaced apart first and second rails (members) may include the threaded apertures (44) where the threads are formed in the respective structural member rather than joining another portion having the apertures (e.g. pipe nuts 32, 34) to the spaced apart members.

Figure 9:
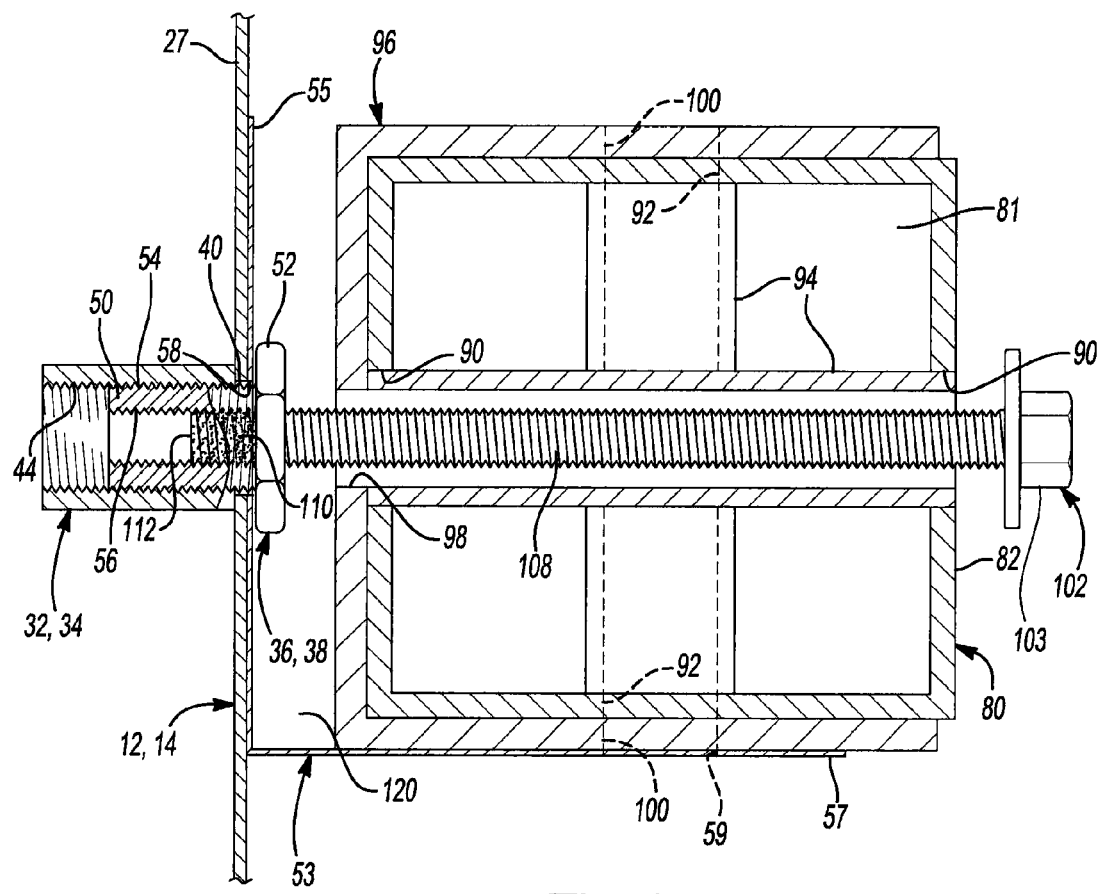
FIG. 9 is a partial cross-sectional view of the front-end module, rail and mounting structure.

The first and second T-nuts 36, 38 may movably engage the threaded apertures 44 of the first and second pipe nuts 32, 34, respectively. As shown in FIG. 9, each of the T-nuts 36, 38 may include a shaft 50 and a head 52. The shaft 50 may include left-handed external threads 54. A threaded aperture 56 including right-handed threads may extend through the shaft 50 and the head 52. The shaft 50 of the T-nuts 36, 38 may extend through the slot 40 and aperture 42, respectively, in the corresponding rail 12, 14 and threadably engage the threaded aperture 42 of the corresponding pipe nut 32, 34.

Each of the first and second rails 12, 14 may include a mounting bracket 53 having first and second legs 55, 57 forming a generally L-shaped cross section. The first leg 55 of each bracket 53 may include a plurality of first apertures 58 and the second leg 57 may include a plurality of second apertures 59. Each of the first apertures 58 may be substantially aligned with one of the slots 40 and apertures 42 in the rails 12, 14. As shown in FIG. 9, the first leg 55 may be disposed between the pipe nuts 32, 34 and the heads 52 of the T-nuts 36, 38. The second leg 57 may extend laterally outward from the rails 12, 14. The mounting brackets 53 may be welded or otherwise fixed to the first and second rails 12, 14. In some embodiments, the mounting brackets 53 could be integrally formed with the first and second rails 12, 14.

Figure 2:
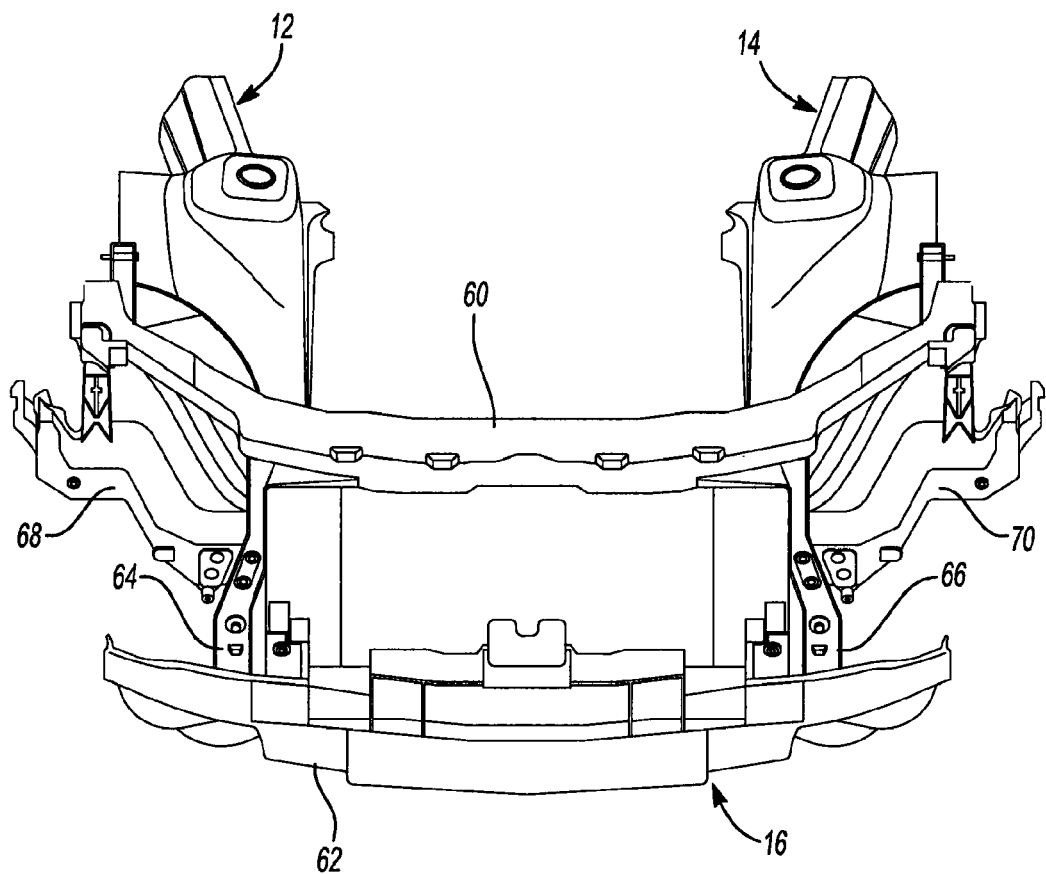
FIG. 2 is a perspective view of a front-end module mounted to first and second rails.

As shown in FIGS. 1 and 2, the front-end module 16 may include an upper cross member 60, a lower cross member 62, a first support member 64, a second support member 66, a first laterally-extending member 68, and a second laterally-extending member 70. The first and second support members 64, 66 may extend between and interconnect the upper and lower cross members 60, 62. The first and second laterally-extending members 68, 70 may extend outwardly from the first and second support members 64, 66, respectively.

The front-end module 16 may support a front-end fascia 72 and one or more cosmetic and/or functional accessories, such as exterior lighting units 74, a grille 76, a bumper 78, and a radiator (not shown), for example. The upper and lower cross members 60, 62 and the first and second support members 64, 66 may cooperate to define a frame supporting the radiator and/or the grille 76. The first and second laterally-extending members 68, 70 may cooperate with the upper cross member 60 and corresponding support members 64, 66 to house the exterior lighting units 74. The lower cross member 62 may support the bumper 78.

Figure 10:
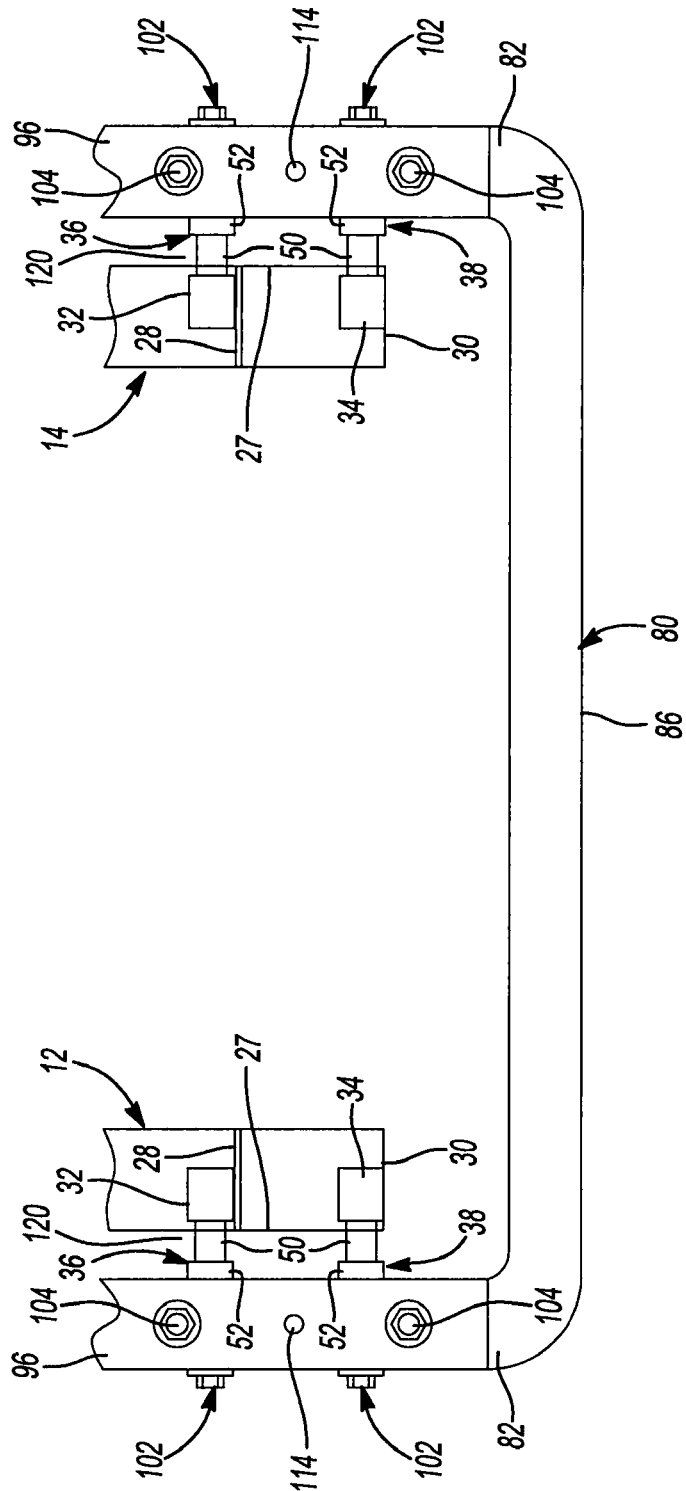
FIG. 10 is a schematic representation of a partial side view of the front-end module, rail and mounting structure according to the principles of the present disclosure.

The lower cross member 62 may include a generally U-shaped cross member 80 having a generally square or rectangular hollow cross section defining an interior volume 81 (FIGS. 9 and 10). The U-shaped cross member 80 may include a pair of vertically-extending members 82 disposed on opposing ends of a horizontal beam 86. The vertically-extending members 82 may include a plurality of first apertures 90 (FIG. 9) and a plurality of second apertures 92 (FIGS. 4 and 9) extending therethrough. The plurality of first apertures 90 may be generally perpendicular to the plurality of second apertures 92. Each of the first and second apertures 90, 92 may engage a corresponding sheath 94 that spans the interior volume 81 of a corresponding one of the vertically-extending members 82.

Figure 3:
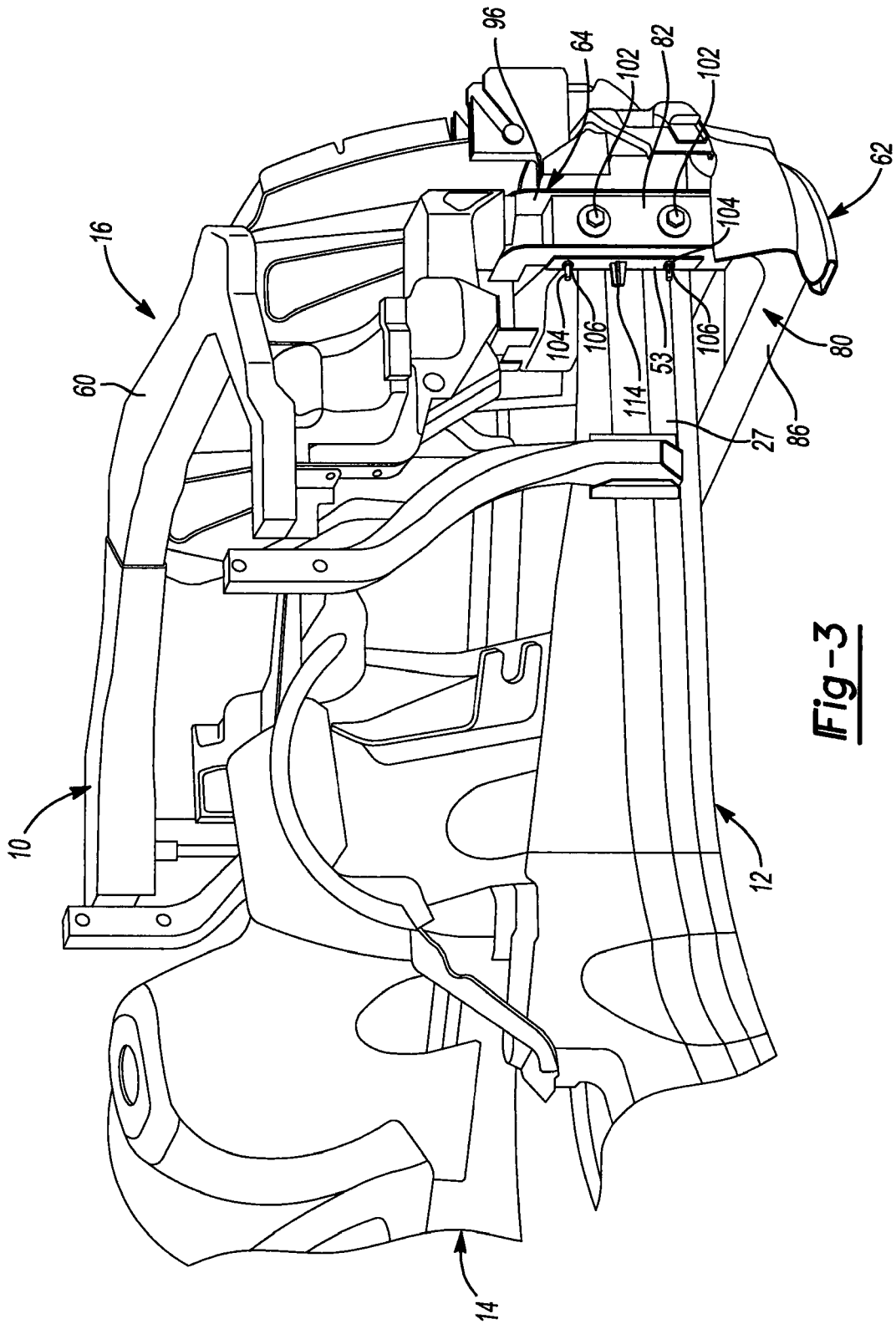
FIG. 3 is a partial perspective view of the frame according to the principles of the present disclosure.
Figure 4:
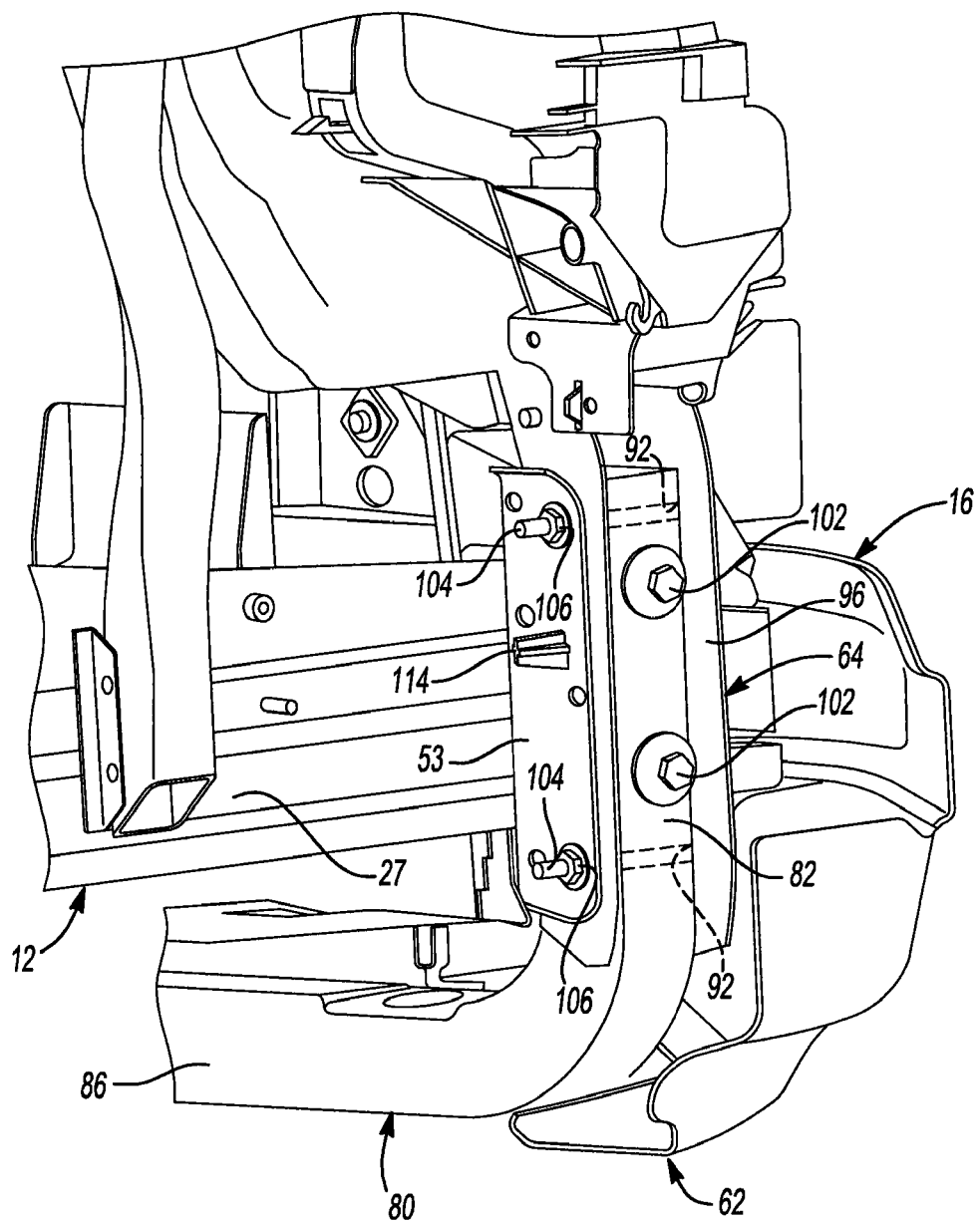
FIG. 4 is a partial perspective view of the frame including structure for mounting the front-end module to one of the rails.
Figure 5:
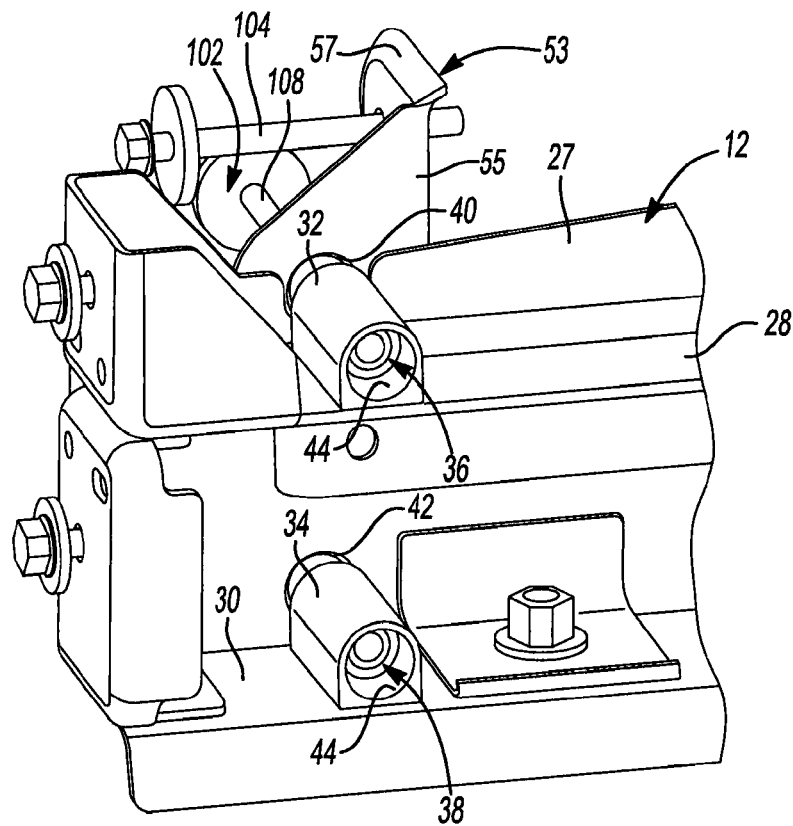
FIG. 5 is a partial perspective view of the rail according to the principles of the present disclosure.
Figure 6:
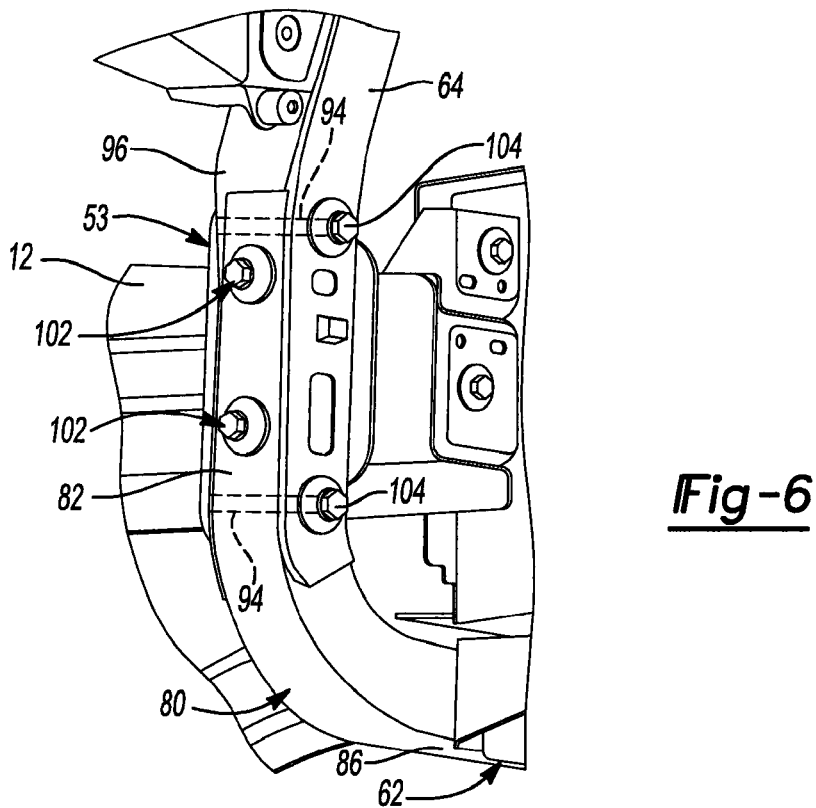
FIG. 6 is a perspective view of the structure of FIG. 4.
Figure 7:
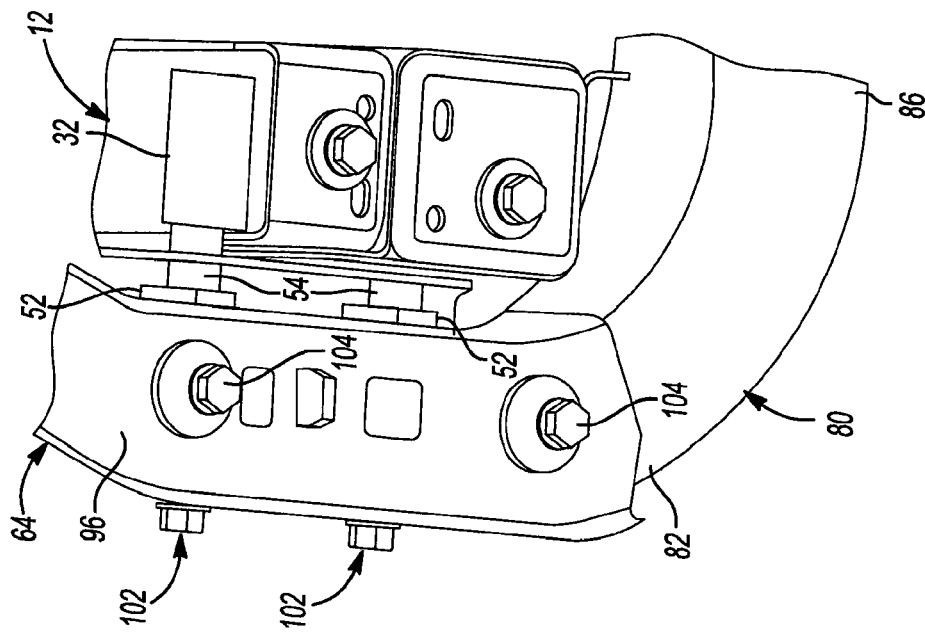
FIG. 7 is a partial perspective view of the structure in a first position relative to the front-end module and the rail.

Each of the first and second support members 64, 66 may include a sleeve 96 having a generally U-shaped cross section that at least partially receives a corresponding one of the vertically-extending members 82 (FIGS. 3, 4, and 6). The sleeve 96 may include a plurality of first apertures 98 and a plurality of second apertures 100. Each of the first and second apertures 98, 100 may be aligned with a corresponding one of the first and second apertures 90, 92, respectively.

Each of a plurality of first threaded fasteners 102 may extend through a corresponding one of the first apertures 90 in the U-shaped cross member 80, the corresponding sheath 94, and the first aperture 98 and threadably engage the threaded aperture 56 in the T-nuts 36, 38. The first fasteners 102 may include heads 103 and right-handed external threads 108. A distal end portion 110 of the external threads 108 may include a film or patch 112 formed from a relatively thin polymeric or metallic material. The patch 112 is sufficiently thin so that the external threads 108 that are covered by the patch 112 may still engage the threaded aperture 56 through the patch 112, but thick enough to provide substantial friction therebetween. In an exemplary embodiment, the patch 112 may be formed from nylon. The patch 112 may be a strip of material that is wrapped onto the threads 108 or the patch 112 may be material that is sprayed onto or otherwise coated on the threads 108, for example. It will be appreciated that other materials and/or methods of applying the patch 112 may be utilized.

Each of a plurality of second threaded fasteners 104 may extend through a corresponding one of the second apertures 92 in the U-shaped cross member 80, the corresponding sheath 94, the second aperture 100 in the sleeve 96, and the second aperture 59 in the mounting bracket 53. Nuts 106 may engage the second fasteners 104 to secure the U-shaped cross member 80 and the support members 64, 66 to the second leg 57 of the mounting brackets 53.

A locating pin 114 may extend from the sleeve 96 of each of the first and second support members 64, 66 and may engage the second leg 57 of the mounting bracket 53. The locating pins 114 may be integrally formed with the first and second support members 64, 66, or alternatively, the locating pins 114 may be discrete components that are inserted through locating or centering apertures in the sleeves 96 and vertically-extending members 82.

With continued reference to FIGS. 1-10, a method of installing the front-end module 16 onto the first and second rails 12, 14 will be described. As described above, the front-end module 16 may be installed onto the remainder of the vehicle 20 after installation of the first and second rails 12, 14. In some embodiments, an engine, motor, and/or other source of rotary power may be installed in the compartment 26 prior to installation of the front-end module 16. The front-end module 16 may be installed with a predetermined alignment relative to the first and second rails 12, 14. For example, the front-end module 16 may be substantially centered in a horizontal direction (relative to the view shown in FIG. 1) relative to the first and second rails 12, 14.

Prior to installation of the front-end module 16, the pipe nuts 32, 34 and the mounting brackets 53 may be welded or otherwise secured to the first and second rails 12, 14. The T-nuts 36, 38 may then be threadably installed into the corresponding pipe nuts 32, 34 such that the heads 52 of the T-nuts 36, 38 are contacting or nearly contacting the first leg 55 of the mounting brackets 53 or the outer portions 27 of the corresponding rails 12, 14. As described above, the external threads 54 of the T-nuts 36, 38 and the threaded apertures 44 of the pipe nuts 32, 34 may include left-handed threads, such that turning the T-nuts 36, 38 in a counterclockwise direction relative to the pipe nuts 32, 34 increases the threaded engagement between the pipe nuts 32, 34 and the T-nuts 36, 38, respectively. Stated another way, counterclockwise rotation of the T-nuts 36, 38 moves the heads 52 of the T-nuts 36, 38 closer to the pipe nuts 32, 34.

Next, the alignment between the front-end module 16 and the first and second rails 12, 14 may be established. For example, a distance between the first and second rails 12, 14 and/or a distance between the sleeves 96 of the first and second support member 64, 66 may be measured or otherwise determined. Such measurements may be acquired using known manual and/or automated methods and means, such as a laser measuring device or coordinate measuring machine (CMM), for example. Based on such measurements, a position of the front-end module 16 relative to the first and second rails 12, 14 may be determined at which the front-end module 16 is horizontally centered relative to the first and second rails 12, 14. Next, the front-end module 16 may be moved into the centered position, and the pins 114 may be inserted into punched or pierced locating or centering apertures, for example, through the second leg 57 of the mounting brackets 53 of the first and second rails 12, 14, thereby establishing the alignment of the front-end module 16 relative to the first and second rails 12, 14.

Figure 8:
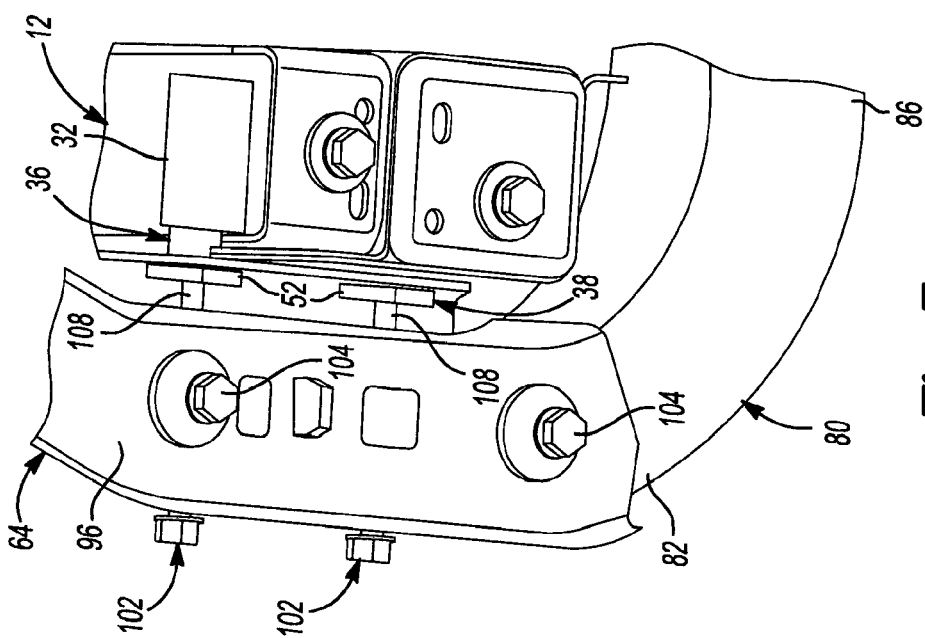
FIG. 8 is a partial perspective view of the structure in a second position relative to the front-end module and the rail.

Next, the plurality of fasteners 102 may be inserted through the vertically-extending members 82 and the sleeve 96 and threadably engaged with the threaded apertures 56 of the T-nuts 36, 38 (FIGS. 8 and 9). Because the threaded apertures 56 and the external threads 108 of the fasteners 102 include right-handed threads, clockwise rotation of the fasteners 102 relative to the T-nuts 36, 38 increases the threaded engagement therebetween.

As described above, the distal end 110 of the fasteners 102 may include the patch 112, which increases the friction between the threads of the fasteners 102 and the threaded aperture 56 of the T-nuts 36, 38. Clockwise rotation of the fasteners 102 may cause corresponding clockwise rotation of the T-nuts 36, 38 relative to the pipe nuts 32, 34, which causes the heads 52 of the T-nuts 36, 38 to move outwardly away from the pipe nuts 32, 34 and towards the sleeve 96. This is because the friction between the threads of the fasteners 102 and the threaded aperture 56 is greater than the friction between the threaded apertures 44 of the pipe nuts 32, 34 and the external threads 54 of the T-nuts 36, 38. Accordingly, as long as the friction between the fasteners 102 and the T-nuts 36, 38 is greater than the friction between the T-nuts 36, 38 and the pipe nuts 32, 34, rotation of the fasteners 102 does not result in relative rotation between the fasteners 102 and the T-nuts 36, 38, but rather, the result is relative rotation between the T-nuts 36, 38 and the pipe nuts 32, 34. Furthermore, because the threaded apertures 56 and the fasteners 102 include right-handed threads, and the threaded apertures 44 of the pipe nuts 32, 34 and the external threads 54 of the T-nuts 36, 38 include left-handed threads, clockwise rotation of the fasteners 102 (and hence clockwise rotation of the T-nuts 36, 38 relative to the pipe nuts 32, 34) causes the T-nuts 36, 38 to move outwardly toward the sleeves 96 from a first position (FIGS. 7 and 9) to a second position (FIGS. 8 and 10).

Continued clockwise rotation of the fasteners 102 may cause the T-nuts 36, 38 to move outwardly until the T-nuts 36, 38 contact the sleeves 96 with enough force to generate more friction counteracting clockwise rotation of the T-nuts 36, 38 relative to the pipe nuts 32, 34 that the friction counteracting relative rotation between the fasteners 102 and the T-nuts 36, 38. Once such relative levels of friction are reached, continued clockwise rotation of the fasteners 102 will cause the fasteners 102 to move inwardly relative to the T-nuts 36, 38 (i.e., increasing threaded engagement between the fasteners 102 and the T-nuts 36, 38). The fasteners 102 may be rotated in such a manner until a sufficiently secure clamping force is achieved between the heads 103 of the fasteners 102 and the heads 52 of the T-nuts 36, 38 to secure the support members 64, 66 and the U-shaped cross member 80 relative to the rails 12, 14 (see FIG. 10).

In this manner, the first threaded fasteners 102 may secure the U-shaped cross member 80 and the first and second support members 64, 66 to the T-nuts 36, 38, which in turn may be secured to the pipe nuts 32, 34, which in turn may be secured to the first and second rails 12, 14. As described above, the heads 52 of the T-nuts 36, 38 provide a surface against which the U-shaped cross member 80 and first and second support members 64, 66 may be mounted. Securing the U-shaped cross member 80 and the first and second support members 64, 66 to the T-nuts 36, 38 in this manner allows for dimensioning of the front-end module 16 relative to the rails 12, 14 such that horizontally-extending gaps 120 exist between the rails 12, 14 and the sleeves 96 of the first and second support members 64, 66 (FIG. 10). Because the T-nuts 36, 38 are threadably adjustable relative to the pipe nuts 32, 34 such that the heads 52 of the T-nuts 36, 38 are horizontally movable relative to the rails 12, 14, the T-nuts 36, 38 are able to span the gaps 120 and still provide a secure mounting surface for the U-shaped cross member 80 and the first and second support members 64, 66. Such an arrangement allows for manufacturing tolerances to be relaxed (i.e., made larger), while maintaining the relative alignment between the front-end module 16 and the rails 12, 14. That is, the mounting arrangement described above reduces or eliminates movement of the front-end module 16 relative to the rails 12, 14 while the front-end module 16 is fastened to the rails 12, 14, thereby maintaining accurate centering of the front-end module 16.

In some embodiments, a sequence in which each of the fasteners 102 are tightened may be a factor in maintaining the alignment between the front-end module 16 and the rails 12, 14. In an exemplary embodiment, the upper fastener 102 (relative to the view shown in FIG. 10) on each side of the vehicle 20 may be tightened to a predetermined torque first, and then the bottom fasteners 102 on each side of the vehicle 20 may be tightened to a predetermined torque. In other embodiments, the torque sequence described above may be performed in the reverse order (i.e., bottom fasteners 102 tightened first). In still other embodiments, it may be beneficial to tighten the plurality of fasteners 102 in some other sequence.

Once the plurality of first fasteners 102 are tightened to the predetermined torque, the plurality of second fasteners 104 may be inserted through the vertically-extending members 82, the sleeves 96 and the second leg 57 of the mounting brackets 53. Nuts 106 may be tightened onto the second fasteners 104 to a predetermined torque to more securely retain the front-end module 16 relative to the rails 12, 14.

While the threaded apertures 56 and the fasteners 102 are described above as including right-handed threads, and the threaded apertures 44 of the pipe nuts 32, 34 and the external threads 54 of the T-nuts 36, 38 are described above as including left-handed threads, it will be appreciated that the handedness of these threads may be reversed. That is, the threaded apertures 56 and the fasteners 102 may include left-handed threads, and the threaded apertures 44 of the pipe nuts 32, 34 and the external threads 54 of the T-nuts 36, 38 may include right-handed threads.

While the pipe nuts 32, 34, T-nuts 36, 38 and fasteners 102 are described above as cooperating to secure the front-end module 16 to the first and second rails 12, 14 while maintaining the relative alignment therebetween, it will be appreciated that in some embodiments, the pipe nuts 32, 34, T-nuts 36, 38 and fasteners 102 could be configured to cooperate to secure another component and/or module of a vehicle frame, body, chassis and/or accessory, for example, to any other component and/or module (or spaced apart pair of components and/or modules) of a vehicle frame, body, chassis and/or accessory and maintain a relative alignment therebetween.

What is claimed is:

1. A structure for a vehicle comprising:
   first and second members being spaced apart from each other;
   first and second internally-threaded members connected to said first and second members, respectively;
   a module positioned between said first and second members for a predetermined alignment relative to said first and second members;
   first and second connecting members each including an outer circumferential surface having external threads and an inner circumferential surface having internal threads, said outer circumferential surface threadably engaging a corresponding one of said first and second internally-threaded members, said external threads and said internal threads having opposite thread-handedness;
   first and second fasteners threadably engaging said internal threads of said first and second connecting members, respectively, said first and second fasteners being configured to move said first and second connecting members toward said module to clamp said module relative to said first and second members and maintain said predetermined alignment between said module and said first and second members;
   a first bracket secured to said first member and a first portion of said module;
   a second bracket secured to said second member and a second portion of said module;
   a first pin engaging said first bracket and said first portion of said module and aligning said first portion relative to said first member; and
   a second pin engaging said second bracket and said second portion of said module and aligning said second portion relative to said second member.

2. The structure of claim 1, wherein said module includes a front-end module and said first and second members include first and second frame rails, said front-end module cooperating with said first and second frame rails to define a compartment adapted to house a source of rotary power.

3. The structure of claim 2, wherein said front-end module is adapted to support at least one of an external light, a bumper, a fascia, and a grille.

4. The structure of claim 1, further comprising third and fourth fasteners securing said module relative to said first and second members, respectively, and extending in a direction that is substantially perpendicular relative to said first and second fasteners.

5. The structure of claim 1, wherein threads of said first and second fasteners are at least partially coated with a polymeric material to provide friction between said first and second fasteners and said internal threads of said first and second connecting members, respectively.

6. The structure of claim 1, wherein said first and second internally threaded members are welded to said first and second members, respectively.

7. The structure of claim 1, wherein said external threads of said first and second connecting members are right-handed threads and said internal threads of said first and second connecting members are left-handed threads.

8. The structure of claim 1, wherein said first connecting member spans a space between said first portion and said first member and said second connecting member spans a space between said second portion and said second member.

9. The structure of claim 1, wherein each of said first and second connecting members includes a head portion abutting said module and spaced apart from said first and second members, said head portions extending radially outward from said outer circumferential surfaces of said first and second connecting members.

10. A method of assembling a vehicle structure comprising:
    providing first and second rails and first and second internally-threaded members connected to the first and second rails, respectively;
    providing first and second connecting members each including internal threads and external threads;
    providing a module including first and second portions;
    engaging said external threads of said first and second connecting members with said first and second internally-threaded members, respectively;
    establishing an alignment of said module relative to said first and second rails by inserting a first pin through said first portion and a first surface extending from said first rail to align said first portion relative to said first rail;
    engaging a first fastener associated with said first portion with said internal threads of said first connecting member;
    rotating said first fastener in a first direction to cause said first connecting member to rotate relative to said first internally-threaded member such that said first connecting member moves away from said first internally-threaded member to secure said module relative to first connecting member; and
    rotating said first fastener in said first direction such that said first fastener moves toward said module to threadably tighten said first fastener relative to said first connecting member to secure said module relative to said first rail.

11. The method of claim 10, wherein securing said first portion relative to said first connecting member maintains said established alignment between said module and said first and second rails.

12. The method of claim 10, further comprising:
    engaging a second fastener associated with said second portion with said internal threads of said second connecting member;
    rotating said second fastener in a first direction to cause said second connecting member to rotate relative to said second internally-threaded member such that said second connecting member moves away from said second internally-threaded member to secure said module relative to second connecting member; and rotating said second fastener in said first direction such that said second fastener moves toward said module to threadably tighten said second fastener relative to said second connecting member to secure said module relative to said second rail.

13. The method of claim 10, wherein establishing said alignment of said module relative to said first and second rails includes inserting a second pin through said second portion and a second surface extending from said second rail to align said second portion relative to said second rail.

14. The method of claim 10, wherein said internal threads of said first and second connecting members include a first handedness and said external threads of said first and second connecting members include a second handedness.

15. The method of claim 14, wherein said internal threads of said first and second connecting members include right-handed threads and said external threads of said first and second connecting members include left-handed threads.

16. The method of claim 10, further comprising coating threads of said first fastener with a polymeric material to provide friction between said threads of said first fastener and said internal threads of said first connecting member.

17. The method of claim 10, wherein each of said first and second connecting members includes a head portion abutting said module and spaced apart from said first and second rails.

18. The method of claim 10, wherein said module is a front-end module.

\* \* \* \* \*